United States Patent
Porter et al.

(10) Patent No.: US 10,738,639 B2
(45) Date of Patent: Aug. 11, 2020

(54) CURVIC SEAL FITTING AND BALANCE WEIGHT LOCATIONS

(71) Applicant: United Technologies Corporation, Farmington, CT (US)

(72) Inventors: Steven D. Porter, Wethersfield, CT (US); Thomas A. Mariano, Middlebury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 610 days.

(21) Appl. No.: 15/156,993

(22) Filed: May 17, 2016

(65) Prior Publication Data
US 2017/0335702 A1  Nov. 23, 2017

(51) Int. Cl.
*F01D 11/00* (2006.01)
*F01D 25/04* (2006.01)
*F01D 5/02* (2006.01)

(52) U.S. Cl.
CPC ............ *F01D 11/005* (2013.01); *F01D 5/025* (2013.01); *F01D 5/026* (2013.01); *F01D 25/04* (2013.01); *F05D 2220/32* (2013.01); *F05D 2240/55* (2013.01)

(58) Field of Classification Search
CPC ........ F01D 11/005; F01D 5/026; F01D 25/04; F01D 5/025; F01D 5/10; F01D 5/066; F05D 2240/55; F05D 2220/32; F05D 2240/60; F05D 2260/36; F05D 2260/403; F16D 1/02
See application file for complete search history.

(56) References Cited

U.S. PATENT DOCUMENTS

| | | |
|---|---|---|
| 3,356,339 A | 12/1967 | Thomas |
| 3,814,539 A | 6/1974 | Klompas |
| 4,061,366 A | 12/1977 | Affa |
| 5,537,814 A | 7/1996 | Nastuk |
| 6,364,634 B1 | 4/2002 | Svihla |
| 6,406,263 B1 | 6/2002 | Meacham |
| 6,568,692 B2 | 5/2003 | Kolodziej |
| 7,309,210 B2 | 12/2007 | Suciu |
| 7,448,221 B2 | 11/2008 | Suciu |
| 8,215,919 B2 | 7/2012 | Jewess |

(Continued)

FOREIGN PATENT DOCUMENTS

EP          1460287 A1  *  9/2004  ............... F16C 3/03

OTHER PUBLICATIONS

EP search report for EP17171600.4 dated Oct. 4, 2017.

*Primary Examiner* — Justin D Seabe
*Assistant Examiner* — Jesse M Prager
(74) *Attorney, Agent, or Firm* — Getz Balich LLC (57) ABSTRACT

Aspects of the disclosure are directed to a seal comprising: a first fitting configured to couple to a first disk, and a curvic joint including curvic teeth, where a first distance between the first fitting and the curvic teeth is equal to or greater than a first thickness of the first disk. In some embodiments, an engine comprises: a compressor disk, a turbine disk, and a seal including: a first fitting configured to couple to the turbine disk, a second fitting configured to couple to the compressor disk, and a curvic joint including curvic teeth, where a first axial distance between the first fitting and the curvic teeth is greater than or equal to a first radial thickness of the turbine disk.

17 Claims, 8 Drawing Sheets

(56) References Cited

U.S. PATENT DOCUMENTS

| | | | |
|---|---|---|---|
| 8,616,854 B2* | 12/2013 | Mahan | F01D 5/026 |
| | | | 416/245 R |
| 8,727,702 B2* | 5/2014 | Augustine | F01D 11/006 |
| | | | 415/115 |
| 2014/0064946 A1 | 3/2014 | Nielsen | |
| 2014/0086740 A1* | 3/2014 | Arnold | F01D 11/001 |
| | | | 415/220 |
| 2015/0322961 A1 | 11/2015 | Slotman | |
| 2016/0010458 A1 | 1/2016 | Virkler | |
| 2017/0191369 A1 | 7/2017 | Partyka et al. | |

* cited by examiner

CURVIC SEAL FITTING AND BALANCE WEIGHT LOCATIONS

BACKGROUND

Gas turbine engines, such as those which power aircraft and industrial equipment, employ a compressor to compress air that is drawn into the engine and a turbine to capture energy associated with the combustion of a fuel-air mixture. As one skilled in the art appreciates, it is necessary to maintain various pressures and temperatures in various portions/regions of the engine in order to ensure engine stability and maximize/enhance engine performance/efficiency.

Figure 2:
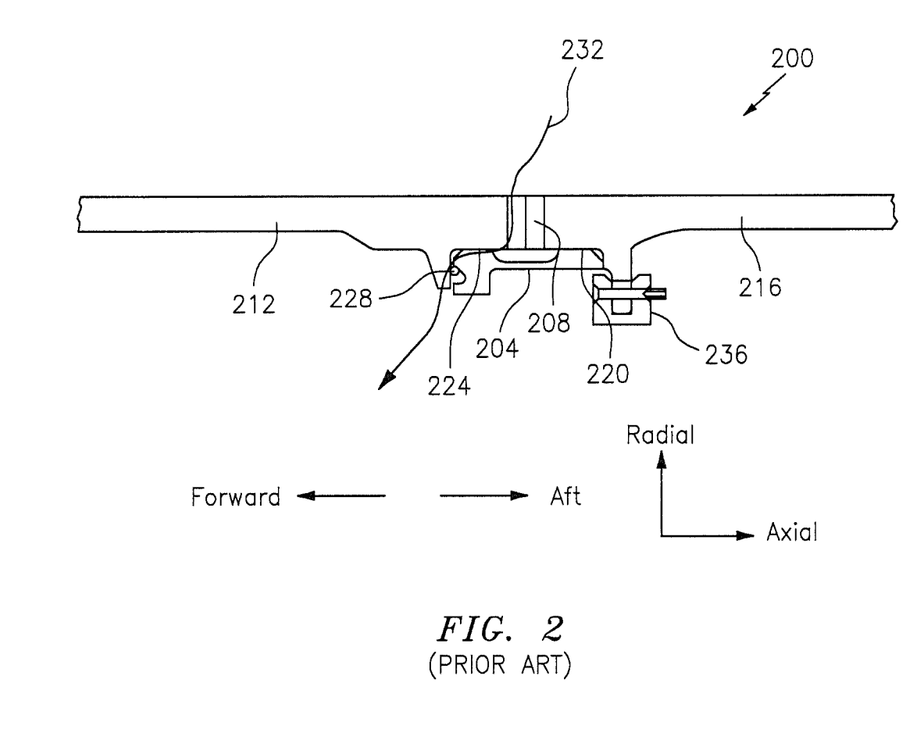
FIG. 2 illustrates a portion of a prior art engine incorporating a curvic seal and a balance weight.

Referring to FIG. 2, a portion of an engine 200 in accordance with the prior art is shown. The engine 200 incorporates a curvic seal 204 that is used to maintain pressure or temperature as described above. A curvic joint 208, which includes curvic teeth, mates/interfaces to a compressor disk 212 of the compressor and a turbine disk 216 of the turbine. The seal 204/joint 208 may provide a centering-feature and transfer of torque as long as a preload in an amount greater than a threshold is maintained.

The seal 204 includes a snap 220 near the aft-most end of the seal 204. The snap 220 allows the seal 204 to engage the turbine disk 216. In contrast to the use of the snap 220, towards the forward end of the seal 204 (in proximity to the location of the reference character 224) a loose fit is provided between the seal 204 and the compressor disk 212. A wire seal 228 is included to counter any leakage 232 (the direction of which is shown in FIG. 2 as flowing from high pressure to low pressure) that might otherwise be experienced due to the loose fit 224. The (axial) proximity of the snap 220 to the joint 208 imparts a hoop stress into the curvic teeth. This stress reduces the useable lifetime of the seal 204.

The engine 200 also includes a balance weight 236. The balance weight 236 accounts for any non-idealities in terms of the orientation of the interface between the joint 208 and the compressor disk 212 or the interface between the joint 208 and the turbine disk 216. As one skilled in the art would appreciate, the non-idealities may be determined based on the use of one or more reference components and one or more algorithms. The algorithms return a result/value that indicates a location on the turbine disk 216 as to where the balance weight 236 should be located. The location of the balance weight 236 is selected so as to be equal in magnitude, but 180 degrees out of phase with, the non-ideality in order to cancel the impact of the non-ideality. While shown in FIG. 2 as attaching to the turbine disk 216, the balance weight 236 may alternatively be attached to the compressor disk 212.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a seal comprising: a first fitting configured to couple to a first disk, and a curvic joint including curvic teeth, where a first distance between the first fitting and the curvic teeth is equal to or greater than a first thickness of the first disk. In some embodiments, the seal further comprises a second fitting configured to couple to a second disk, where a second distance between the second fitting and the curvic teeth is equal to or greater than a second thickness of the second disk. In some embodiments, the first fitting is a first interference fitting. In some embodiments, the second fitting is a second interference fitting. In some embodiments, the second fitting is a loose fitting. In some embodiments, the seal further comprises a wire seal incorporated as part of the second fitting. In some embodiments, the seal further comprises a balance weight. In some embodiments, the balance weight is substantially located in the same axial plane as the curvic joint. In some embodiments, the seal further comprises an anti-rotation tab configured to couple to a slot of the first disk. In some embodiments, the first distance is less than three times the thickness of the first disk.

Aspects of the disclosure are directed to an engine comprising: a compressor disk, a turbine disk, and a seal including: a first fitting configured to couple to the turbine disk, a second fitting configured to couple to the compressor disk, and a curvic joint including curvic teeth, where a first axial distance between the first fitting and the curvic teeth is greater than or equal to a first radial thickness of the turbine disk. In some embodiments, a second axial distance between the second fitting and the curvic teeth is greater than or equal to a second radial thickness of the compressor disk. In some embodiments, at least one of the first fitting and the second fitting is an interference fitting. In some embodiments, one of the first fitting and the second fitting is an interference fitting and the other of the first fitting and the second fitting is a loose fitting. In some embodiments, the engine further comprises a wire seal incorporated as part of the loose fitting. In some embodiments, the seal includes a balance weight. In some embodiments, the balance weight is substantially located in the same axial plane as the curvic joint. In some embodiments, the seal includes an anti-rotation tab configured to couple to a slot of the turbine disk. In some embodiments, the seal includes an anti-rotation tab configured to couple to a slot of the compressor disk.

BRIEF DESCRIPTION OF THE DRAWINGS

The present disclosure is illustrated by way of example and not limited in the accompanying figures in which like reference numerals indicate similar elements. The drawings are not necessarily drawn to scale unless specifically indicated otherwise.

DETAILED DESCRIPTION

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with aspects of the disclosure, apparatuses, systems, and methods are directed to a curvic seal. The seal may be incorporated as part of one or more sections of an engine. The seal may include one or more snaps for coupling the seal to a compressor disk or a turbine disk. A location of a snap may be related to a dimension of the compressor disk or a dimension of the turbine disk. In some embodiments, a balance weight/flange may be incorporated in proximity to a curvic joint. In some embodiments, the seal may include a tab that mates with a slot in the compressor disk and/or a slot in the turbine disk to provide anti-rotation.

Figure 1:
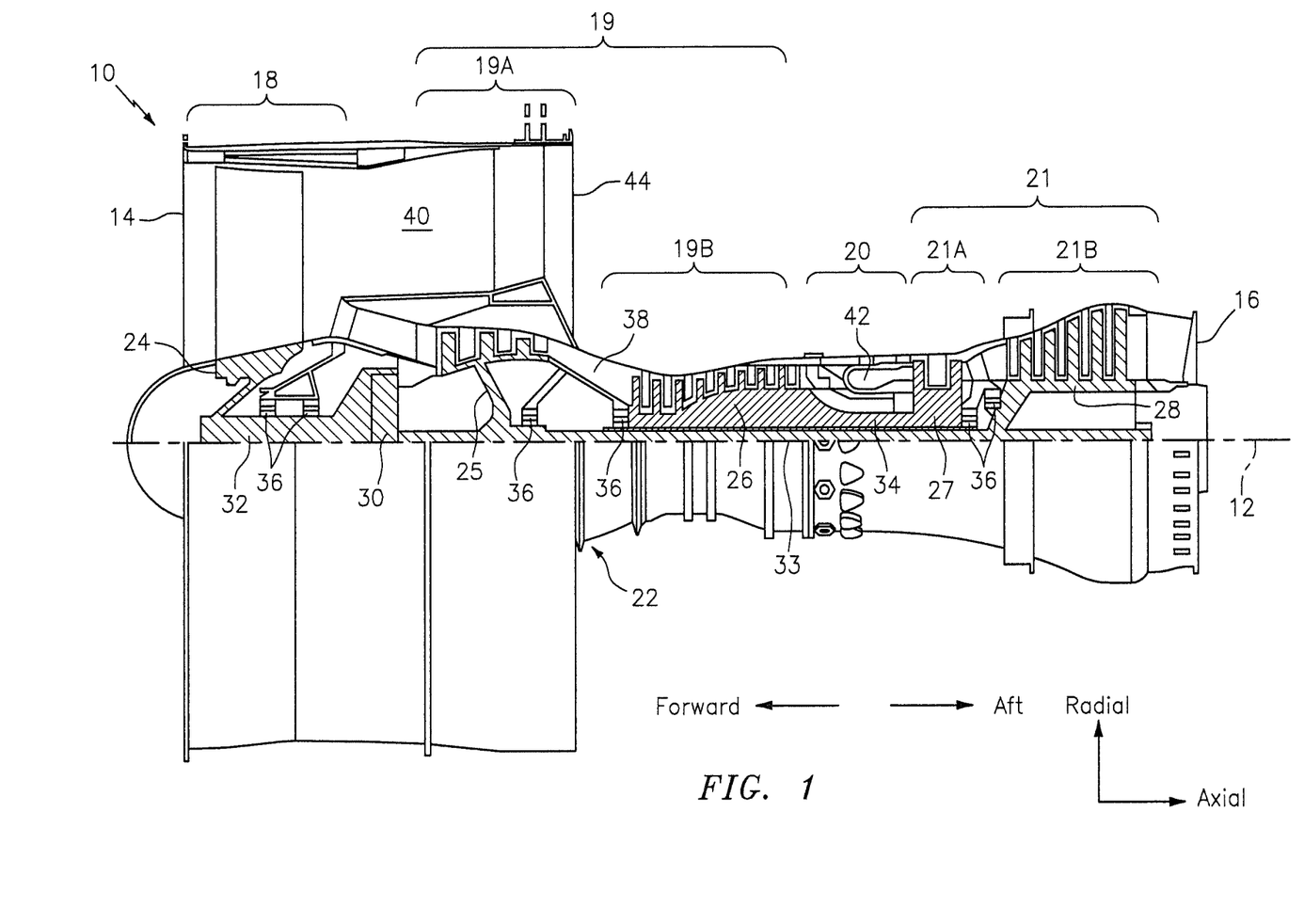
FIG. 1 is a side cutaway illustration of a geared turbine engine.

Aspects of the disclosure may be applied in connection with a gas turbine engine. FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. The gear train 30 and the LPC rotor 25 are connected to and driven by the LPT rotor 28 through a low speed shaft 33. The HPC rotor 26 is connected to and driven by the HPT rotor 27 through a high speed shaft 34. The shafts 32-34 are rotatably supported by a plurality of bearings 36; e.g., rolling element and/or thrust bearings. Each of these bearings 36 is connected to the engine housing 22 by at least one stationary structure such as, for example, an annular support strut.

During operation, air enters the turbine engine 10 through the airflow inlet 14, and is directed through the fan section 18 and into a core gas path 38 and a bypass gas path 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

FIG. 1 represents one possible configuration for an engine 10. Aspects of the disclosure may be applied in connection with other environments, including additional configurations for gas turbine engines. Aspects of the disclosure may be applied in connection with non-geared engines.

Figure 3:
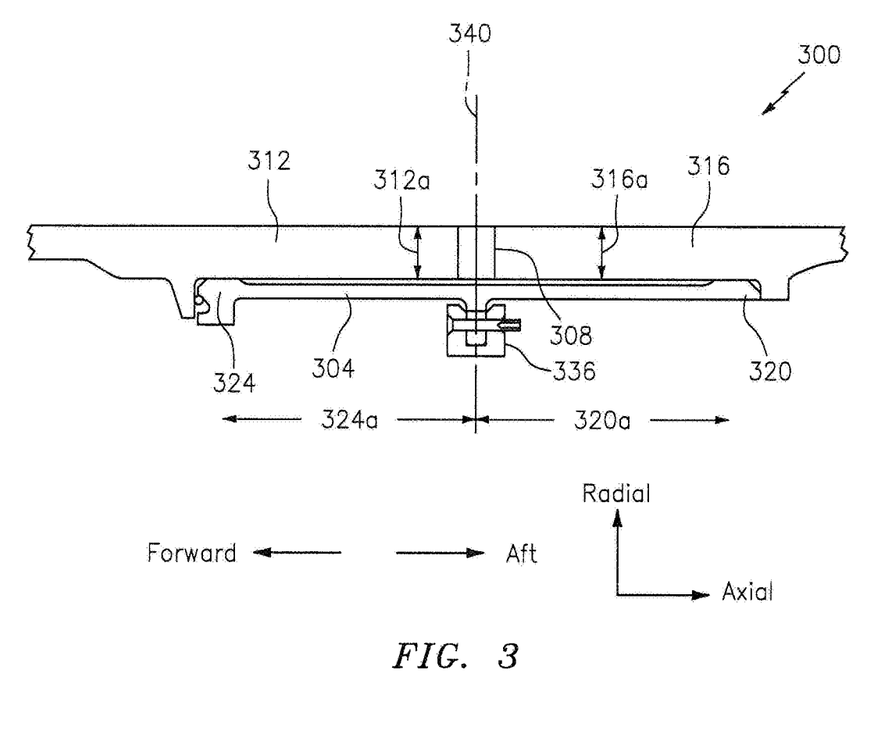
FIG. 3 illustrates a portion of an engine in accordance with aspects of this disclosure.

Referring to FIG. 3, a portion of an engine 300 is shown. The engine 300 may include a curvic seal 304 and a curvic joint 308 (which may include curvic teeth). The curvic joint 308 may interface to a compressor disk 312 and a turbine disk 316. The seal 304 may include a fitting 320 that may couple the seal 304 to the turbine disk 316. The seal 304 may include a fitting 324 that may couple the seal 304 to the compressor disk 312.

One or both of the fittings 320 and 324 may be implemented as interference fittings. One of the fittings 320 and 324 may be implemented as a loose fitting. To the extent that a loose fitting is used, a wire seal (e.g., the wire seal 228) may be incorporated as part of that loose fitting to reduce/minimize any leakage (e.g., the leakage 232) in a manner similar to that described above with respect to FIG. 2.

As shown in FIG. 3, the compressor disk 312 may have a thickness (e.g., a radial thickness) 312a. The turbine disk 316 may have a thickness (e.g., a radial thickness) 316a. The fitting 320 may be located a distance (e.g., an axial distance) 320a from the curvic joint/teeth 308. The fitting 324 may be located a distance (e.g., an axial distance) 324a from the curvic joint/teeth 308.

The distances 320a and 324a may be related to the thicknesses 316a and 312a, respectively. For example, and referring to FIG. 4, a plot 400 is depicted of stress (shown on the vertical axis) imposed on the teeth of the curvic joint 308 from an interference fit 320 versus distance (e.g., distance 320a or 324a) (shown on the horizontal axis).

Figure 4:
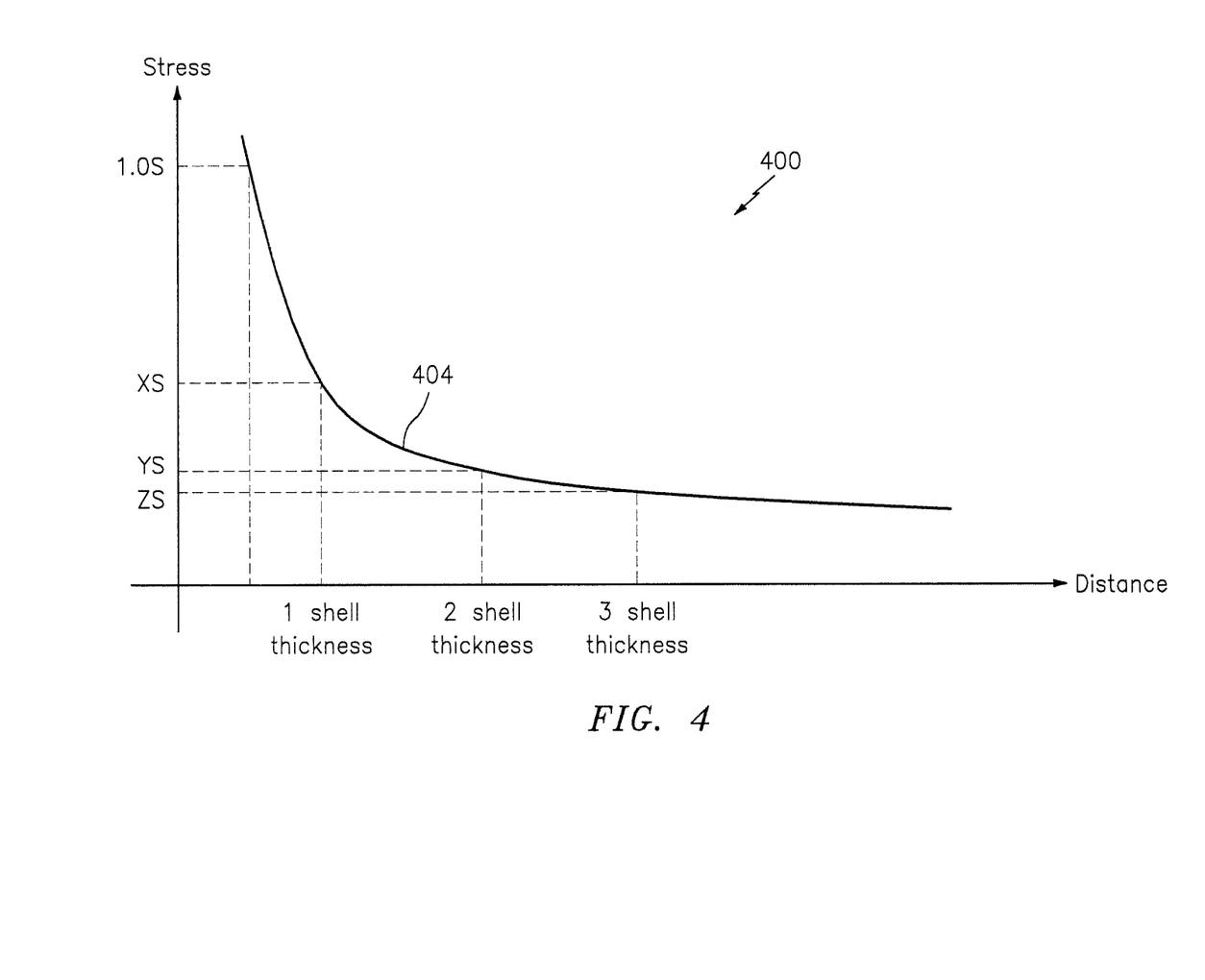
FIG. 4 illustrates a plot of stress versus fitting distance in accordance with aspects of this disclosure.

As part of the plot 400, various values of the distance are depicted and expressed as a multiple of a "shell thickness"/ "disk thickness" (e.g., thickness 316a or 312a), where the thickness is measured/specified within an axial span/profile of the seal. Similarly, various values of the stress are depicted and expressed relative to a reference value of the stress (e.g., 1.0 S) taken at a distance that is less than 1 shell thickness. For example, at a distance of one (1) shell thickness the stress may have a value expressed as the product of X and S, where X is less than 1.0. At a distance of two (2) shell thicknesses, the stress may have a value expressed as the product of Y and S, where Y is less than X. At a distance of three (3) shell thicknesses, the stress may have a value expressed as the product of Z and S, where Z is less than Y.

As reflected in FIG. 4, as the distance increases the stress imposed decreases. Moreover, due to the (exponential) profile/shape of the curve 404 associated with the plot 400, the rate at which the stress is reduced may decrease with each incremental unit (e.g., each incremental multiple of shell thickness) of distance that is used. In this respect, a trade-off may be made in a given application environment between the stress that the seal experiences and the overall distance/ space that the seal consumes. It has been determined that an approximate distance of at least one shell thickness is desirable in most application environments. But for a few rare instances, it might not be worth using a distance greater than three shell thicknesses as the reduction in stress that is obtained is likely not worth the extra space that the seal consumes. In this respect, the distance may be provisioned to have a value within a range of one and three shell thicknesses in some embodiments.

Due to the distances 320a and 324a of the fittings 320 and 324 relative to the curvic joint 308 being substantially larger than in conventional seal designs, a balance weight/flange 336 may be substantially located in the same axial station/plane 340 as the curvic joint 308. As shown in FIG. 3, the balance weight 336 may be located on the seal 304.

Figure 5A:
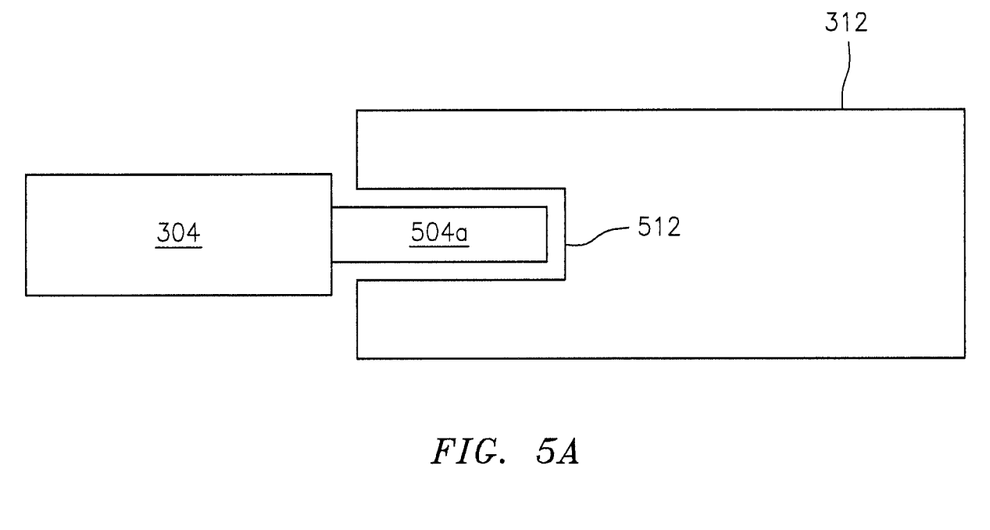
FIGS. 5A-5B illustrate a tab of a seal coupled to a slot of a disk in accordance with aspects of this disclosure.
Figure 5B:
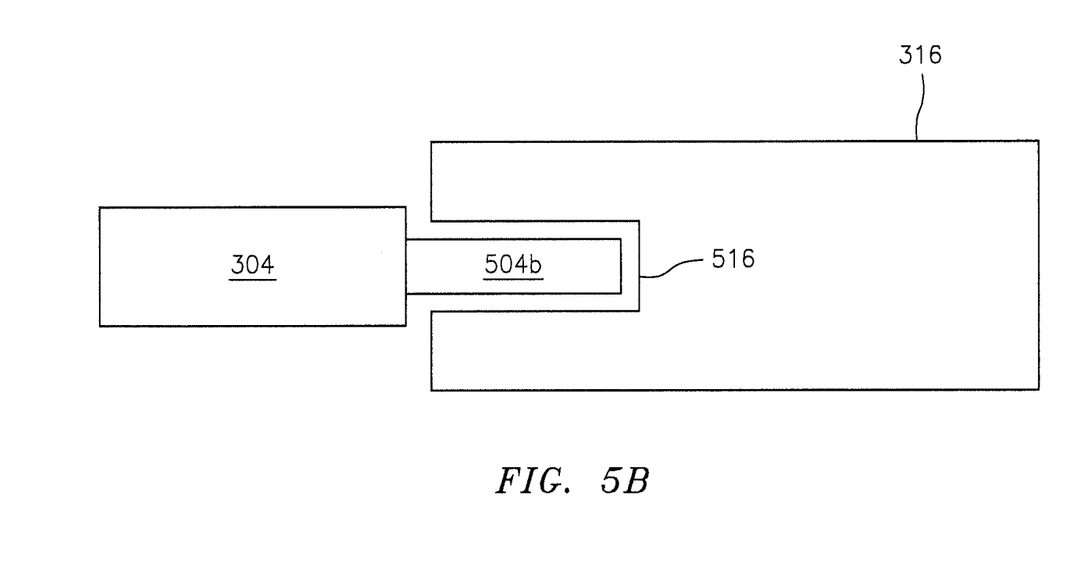

Referring to FIG. 5A, the seal 304 may include one or more tabs (e.g., a tab 504a) that may be coupled to (e.g., seated within) one or more counterpart slots (e.g., slot 512) formed in the compressor disk 312. Together, the tab 504a and the slot 512 may provide an anti-rotation feature with respect to the seal 304. Referring to FIG. 5B, in some embodiments one or more slots (e.g., a slot 516) may be formed in the turbine disk 316 to provide for anti-rotation via a coupling of one or more counterpart tabs (e.g., tab 504b) of the seal 304 and the slot 516.

Figure 6:
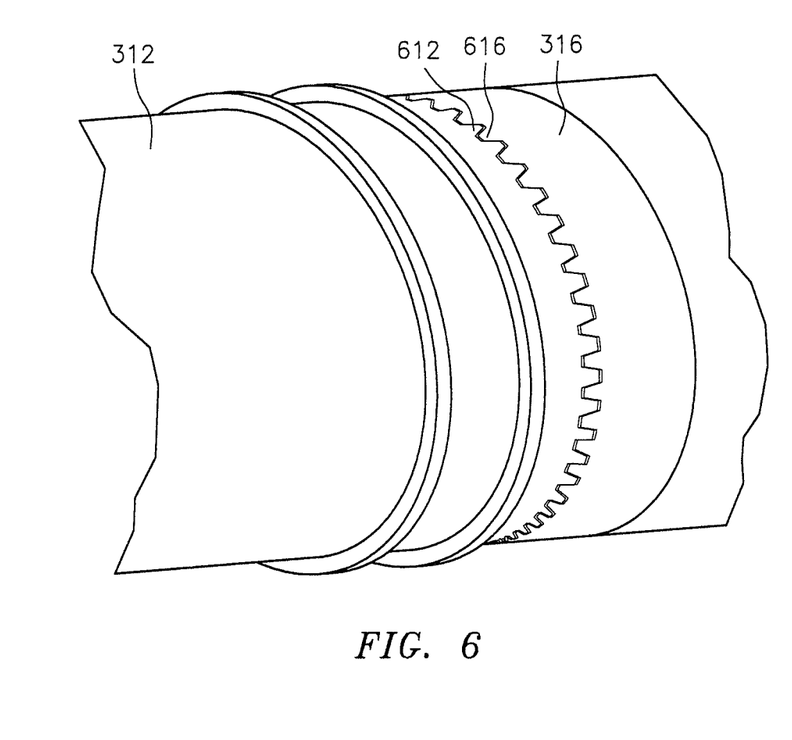
FIG. 6 illustrates a curvic interface between a first disk and a second disk in accordance with aspects of this disclosure.
Figure 7:
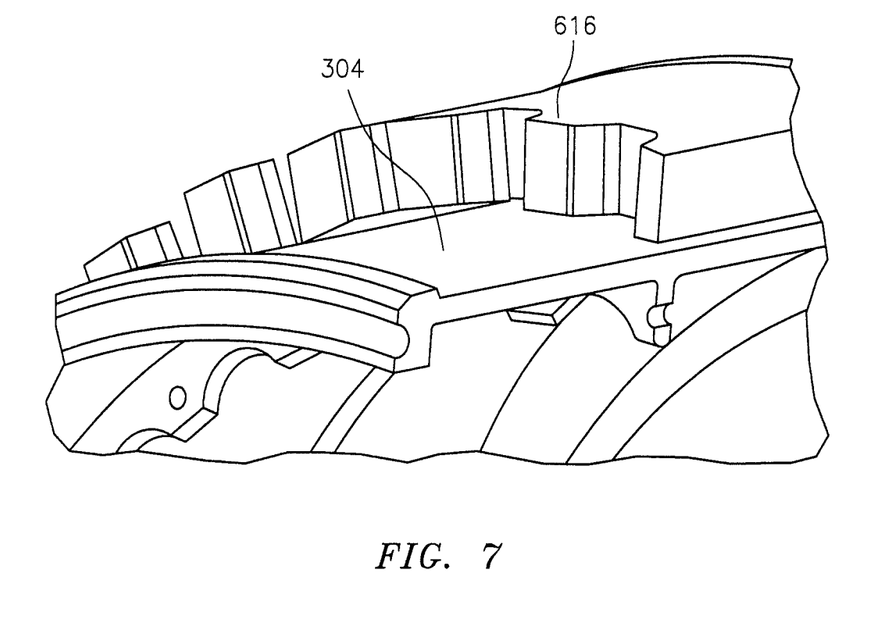
FIG. 7 illustrates a seal incorporated as part of a curvic interface in accordance with aspects of this disclosure.

Referring to FIG. 6, a curvic interface between the compressor disk 312 and the turbine disk 316 is shown. For example, teeth 612 of the compressor disk 312 are shown as engaging teeth 616 of the turbine disk 316. In FIG. 7, the seal 304 is shown in proximity/relationship to the teeth 616.

Technical effects and benefits of this disclosure include a seal that has an enhanced lifetime relative to a conventional seal, where the useable lifetime of the seal is based on the stress that is imposed on the seal. A reduction in stress may be obtained by extending a distance between a curvic joint/teeth and a fitting of the seal, the fitting coupling the seal and a disk. In some embodiments, the location of a balance weight in the same axial plane as a curvic joint may provide an enhanced ability to correct imbalance at the curvic joint.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. A seal assembly comprising:
a curvic joint defining an interface between a first shaft and a second shaft, the curvic joint including curvic teeth; and
a curvic seal body comprising a first fitting coupled to the first shaft, the curvic seal body having a balance weight positioned thereon,
wherein a first axial distance between the first fitting and the curvic teeth is equal to or greater than a first radial thickness of the first shaft within an axial span of the curvic seal body.

2. The seal assembly of claim 1,
where the curvic seal body comprises a second fitting coupled to the second shaft, and
wherein a second axial distance between the second fitting and the curvic teeth is equal to or greater than a second radial thickness of the second shaft at the curvic joint.

3. The seal assembly of claim 2, wherein the first fitting is a first interference fitting.

4. The seal assembly of claim 3, wherein the second fitting is a second interference fitting.

5. The seal assembly of claim 3, wherein the second fitting is a loose fitting.

6. The seal assembly of claim 5, further comprising:
a wire seal incorporated as part of the second fitting.

7. The seal assembly of claim 1, wherein at least a portion of the balance weight is located in a same axial plane as the curvic joint.

8. The seal assembly of claim 1,
wherein the curvic seal body comprises an anti-rotation tab coupled to a slot of the first shaft.

9. The seal assembly of claim 1, wherein the first distance is less than three times the first radial thickness of the first shaft within an axial span of the curvic seal body.

10. An engine comprising:
a compressor shaft;
a turbine shaft; and
a seal assembly including:
a curvic seal body comprising a first fitting coupled to the turbine shaft and a second fitting coupled to the compressor shaft the curvic seal body having a balance weight positioned thereon; and
a curvic joint defining an interface between the compressor shaft and the turbine shaft, the curvic joint including curvic teeth;
wherein a first axial distance between the first fitting and the curvic teeth is greater than or equal to a first radial thickness of the turbine shaft within an axial span of the curvic seal body and wherein the first axial distance is less than three times the first radial thickness of the turbine shaft within the axial span of the curvic seal body.

11. The engine of claim 10, wherein a second axial distance between the second fitting and the curvic teeth is greater than or equal to a second radial thickness of the compressor shaft within an axial span of the curvic seal body.

12. The engine of claim 10, wherein at least one of the first fitting and the second fitting is an interference fitting.

13. The engine of claim 10, wherein one of the first fitting and the second fitting is an interference fitting and the other of the first fitting and the second fitting is a loose fitting.

14. The engine of claim 13, further comprising:
a wire seal incorporated as part of the loose fitting.

15. The engine of claim 10, wherein at least a portion of the balance weight is located in the same axial plane as the curvic joint.

16. The engine of claim 10, wherein the curvic seal body includes an anti-rotation tab coupled to a slot of the turbine shaft.

17. The engine of claim 10, wherein the curvic seal body includes an anti-rotation tab coupled to a slot of the compressor disk.

* * * * *